United States Patent
Newman

(10) Patent No.: US 10,644,279 B2
(45) Date of Patent: May 5, 2020

(54) DAMPING ARRANGEMENT FOR BATTERY CELL

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 430 days.

(21) Appl. No.: 15/392,508

(22) Filed: Dec. 28, 2016

(65) Prior Publication Data

US 2018/0047957 A1 Feb. 15, 2018

Related U.S. Application Data

(60) Provisional application No. 62/372,770, filed on Aug. 9, 2016, provisional application No. 62/372,768, filed on Aug. 9, 2016.

(51) Int. Cl.
*H01M 2/10* (2006.01)
*H01M 2/14* (2006.01)

(52) U.S. Cl.
CPC ........... *H01M 2/1077* (2013.01); *H01M 2/10* (2013.01); *H01M 2/105* (2013.01)

(58) Field of Classification Search
CPC ....... H01M 2/1077; H01M 2/10; H02M 2/105
See application file for complete search history.

(56) References Cited

U.S. PATENT DOCUMENTS

| | | | | |
|---|---|---|---|---|
| 2012/0121949 A1* | 5/2012 | Eberhard | ............... | H01M 2/105 |
| | | | | 429/82 |
| 2013/0337307 A1* | 12/2013 | Butterfield | .............. | H01M 2/10 |
| | | | | 429/99 |
| 2014/0045037 A1* | 2/2014 | Nishikawa | .......... | H01M 2/0267 |
| | | | | 429/156 |
| 2014/0178723 A1* | 6/2014 | Tsujioka | ................. | H01M 2/12 |
| | | | | 429/72 |

\* cited by examiner

*Primary Examiner* — Robert S Jones
*Assistant Examiner* — Rachel L Zhang
(74) *Attorney, Agent, or Firm* — Sheridan Ross P.C.

(57) ABSTRACT

A battery pack including a plurality of battery cells and a battery housing defining a plurality of receptacles each configured to support a respective one of the plurality of battery cells is provided. A plurality of damping inserts are each arranged within a respective one of the plurality of receptacles and positioned between a respective one of the plurality of battery cells and the battery housing.

20 Claims, 4 Drawing Sheets

DAMPING ARRANGEMENT FOR BATTERY CELL

INCORPORATION BY REFERENCE

The following documents are incorporated herein by reference as if fully set forth: U.S. Provisional Patent Application No. 62/372,770, filed Aug. 9, 2016; and U.S. Provisional Patent Application No. 62/372,768, filed Aug. 9, 2016.

FIELD OF INVENTION

The present disclosure relates to vibration and acceleration isolation of a battery cell and auxiliary components from a surrounding system, and, more particularly relates to battery cell damping and stabilization.

BACKGROUND

Battery packs in electric vehicles are comprised of a plurality of battery cells, each individually mounted within the battery pack. As an electric vehicle is driven, the battery packs inside the electric vehicles experience a variety of forces caused by the motion of the electric vehicle. For example, the battery pack will bounce up and down as the electric vehicle hits a pothole or other obstacle. Additionally, the battery pack experiences vibration and other forces during normal operation as the electric vehicle turns, accelerates, decelerates, etc. These vibrational forces can damage the battery cells or otherwise cause the battery cells to malfunction.

It would be desirable to provide an adaptive configuration that accommodates undesirable vibrational forces and disturbances experienced by a battery pack for an electric vehicle.

SUMMARY

A battery pack including a damping insert to accommodate vibrations and disruptions to the battery pack is provided. The battery pack includes a plurality of battery cells and a battery housing defining a plurality of receptacles each configured to support a respective one of the plurality of battery cells is provided. A plurality of damping inserts are each arranged within a respective one of the plurality of receptacles and positioned between a respective one of the plurality of battery cells and the battery housing.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
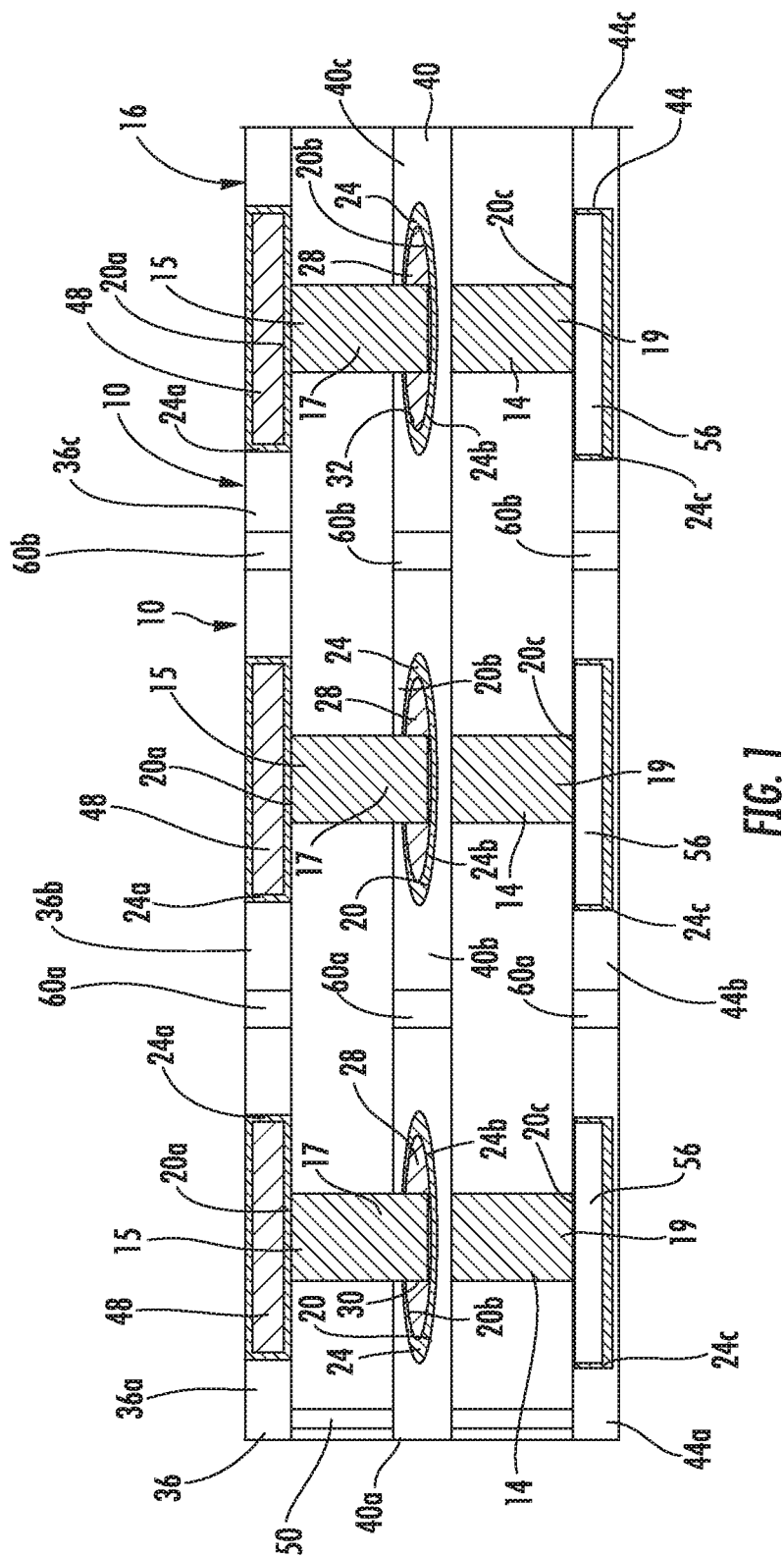
FIG. 1 illustrates a battery pack including a plurality of damping inserts according to one embodiment.

FIG. 1 illustrates a battery pack 10 including a plurality of battery cells 14. A battery housing 16 defines a plurality of receptacles 20 each configured to support a respective one of the plurality of battery cells 14. The battery housing 16 generally provides a supportive housing to captively secure each of the battery cells 14. A plurality of damping inserts 24 are each arranged within a respective one of the plurality of receptacles 20 and are positioned between a respective one of the plurality of battery cells 14 and the battery housing 16.

The plurality of damping inserts 24 are formed from a material having greater flexibility than a material of the battery housing 16. The damping inserts 24 are formed from a material having a higher damping coefficient than a material of the battery housing 16. The battery housing 16 is formed from a relatively rigid material compared to a material of the damping inserts 24. In one embodiment, the battery housing 16 is formed from a hard plastic. In one embodiment, the battery housing 16 is formed from acrylonitrile butadiene styrene (ABS). The damping inserts 24 are preferably formed from a high damping material, such as rubber. In one embodiment, the damping inserts 24 are formed from a polymer or a metal alloy. Each one of the plurality of damping inserts 24 circumferentially surrounds a respective one of the plurality of battery cells 14. The inserts 24 provide a damping effect in 360° around the circular battery cells 14. The plurality of damping inserts 24 are each molded integrally with the battery housing 16. The damping inserts 24 can be formed from nylon, neoprene, silicone, EPDM rubber (ethylene propylene diene monomer (M-class) rubber), high-density polyethylene (HDPE), Delrin®, or any other flexible material.

The damping inserts 24 are preferably embodied as circular discs or rings that surround the battery cells 14. One of ordinary skill in the art would recognize from this disclosure that alternative forms of damping inserts can be used.

As shown in FIG. 1, the battery housing 16 includes a first rack 36 defining a first plurality of receptacles 20a each configured to support a top portion 15 of a respective one of the plurality of battery cells 14. A second rack 40 defines a second plurality of receptacles 20b each configured to support a medial portion 17 of a respective one of the plurality of battery cells 14. A third rack 44 defines a third plurality of receptacles 20c each configured to support a bottom portion 19 of a respective one of the plurality of battery cells 14. Although three racks are illustrated in FIG. 1, one of ordinary skill in the art will recognize from the present disclosure that any number of racks can be used to provide support for the battery cells. In one embodiment, the battery housing may include a single, continuous rack that supports the entire length of the battery cell.

In the embodiment shown in FIG. 1, the battery pack 10 includes a plurality of guide sleeves 28. Each one of the plurality of guide sleeves 28 contacts a respective one of the plurality of battery cells 14 at an inner periphery 30, and a respective one of the damping inserts 24 is connected to an outer periphery 32 of each of the plurality of guide sleeves 28. The guide sleeves 28 provide an interference fit with respect to the outer surface of the battery cells 14. The guide sleeves 28 secure the battery cells 14 within the battery pack 10. The guide sleeves 28 are arranged on the second rack 40 to support the medial portion 17 of the battery cells 14. In one embodiment, the guide sleeves 28 are co-molded with the damping inserts 24.

The first rack 36 includes a busbar 48 that is electrically connected to the plurality of battery cells 14. The busbar 48 provides electrical signals and connections with respect to the battery cells 14, and are generally known to those of ordinary skill in the art. As shown in FIG. 1, the busbar 48 is surrounded by a damping insert 24a. The damping inserts 24a are preferably co-moulded with the first rack 36. The damping inserts 24a provide an additional degree of flexibility with respect to the first rack 36 and the battery cell 14 (shown in FIG. 2) compared to known battery packs.

The second plurality of receptacles 20b of the second rack 40 are defined as through apertures. The second rack 40 acts as a bearing or guide for the medial portion 17 of the battery cells 14. The third rack 44 includes a cooling plate 56 that directly contacts the battery cells 14. The cooling plate 56 provides a thermal exchange conduit to maintain the battery cells 14 at an optimum operating temperature, and is generally well known to those of ordinary skill in the art. A second plurality of damping inserts 24b are arranged between the second rack 40 and the medial portion 17 of the plurality of battery cells 14, and a third plurality of damping inserts 24c are arranged between the third rack 44 and the cooling plate 56. Each of the damping inserts 24a, 24b, 24c provide a degree of flexibility of the battery housing 16 with respect to the battery cells 14. A common linking arm 50 shown in FIG. 1 ensures that each of the racks 36, 40, 44 move in unison when the battery housing 16 experiences vibrational forces. The linking arm 50 is shown schematically in FIG. 1, and one of ordinary skill in the art would recognize from the present disclosure that other linking components can be used to ensure each of the racks 36, 40, 44 move together. Alternatively, the battery housing 16 provides a common mounting point for each of the racks 36, 40, 44, and ensures that each of the racks move in unison. One of ordinary skill in the art would recognize from the present disclosure that any one of the damping inserts 24a, 24b, 24c can be omitted.

As shown in FIG. 1, the first rack 36 is segmented into a plurality of first rack portions 36a, 36b, 36c. A plurality of first joints 60a, 60b are arranged between each one of the plurality of first rack portions 36a, 36b, 36c. The plurality of first joints 60a, 60b are comprised of a material having a higher flexibility than a material of the first rack 36. In one embodiment, the plurality of first joints 60a, 60b are formed from the same material as the plurality of damping inserts 24. The second rack 40 and third rack 44 have the same structure as the first rack 36. The second rack 40 and the third rack 44 include joints 60a, 60b that separate a plurality of second rack portions 40a, 40b, 40c and third rack portions 44a, 44b, 44c. The joints 60a, 60b provide additional degrees of freedom for the battery housing 16 to flex and accommodate vibrations, motion, acceleration, or disturbances.

Figure 2:
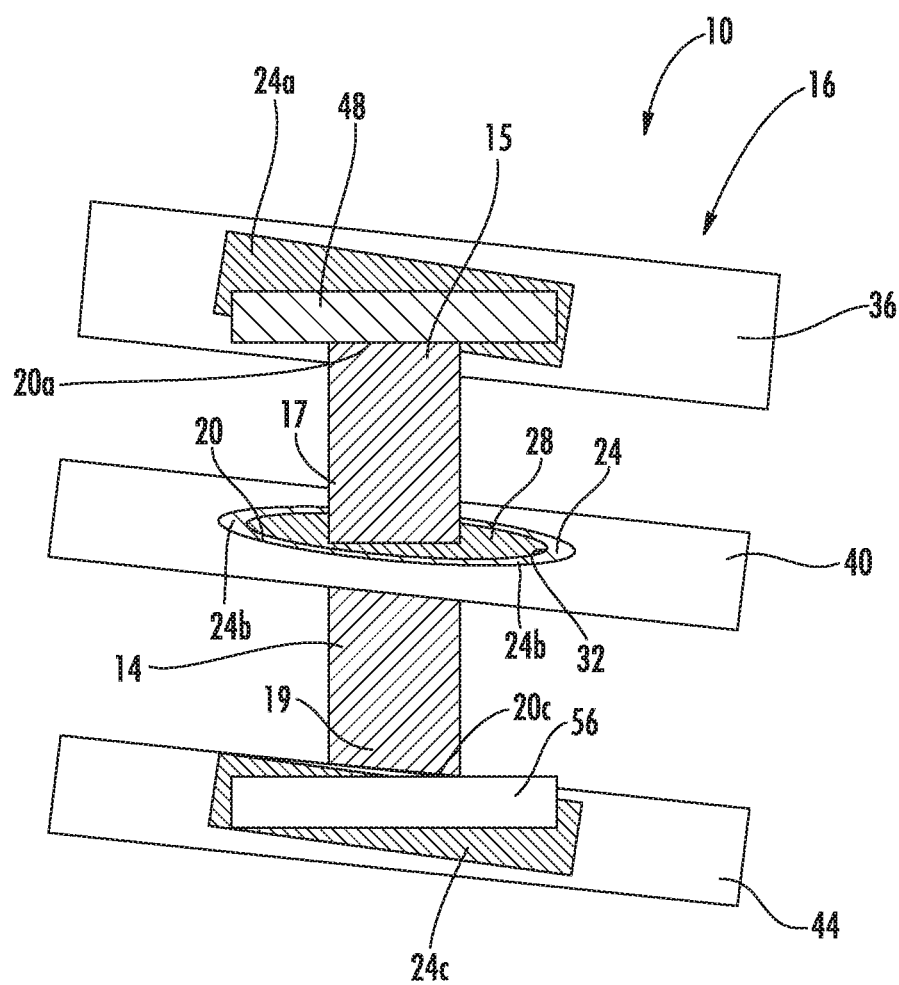
FIG. 2 illustrates an exemplary battery cell of the battery pack of FIG. 1 in a disrupted state.

FIG. 2 illustrates an exemplary battery cell 14 within the battery housing 16 experiencing vibration to schematically illustrate the effect of the damping insert 24 during a vibrational shock. The effect of the vibration is exaggerated in this illustration to visually convey the effect of the damping inserts 24a, 24b, 24c. The damping inserts 24a, 24b, 24c allow the racks 36, 40, 44 of the battery housing 16 to flex, bend, or otherwise move when the battery housing 16 experiences a vibration or disruption such that the external forces experienced by the battery housing 16 are dampened or lessened. The damping inserts 24a, 24b, 24c provide flexibility of the battery cells 14 with respect to the battery housing 16, while ensuring that the busbar 48 and cooling plate 56 maintain contact with the battery cells 14 so that the battery cells 14 continue normal operation during the vibration.

Figure 3:
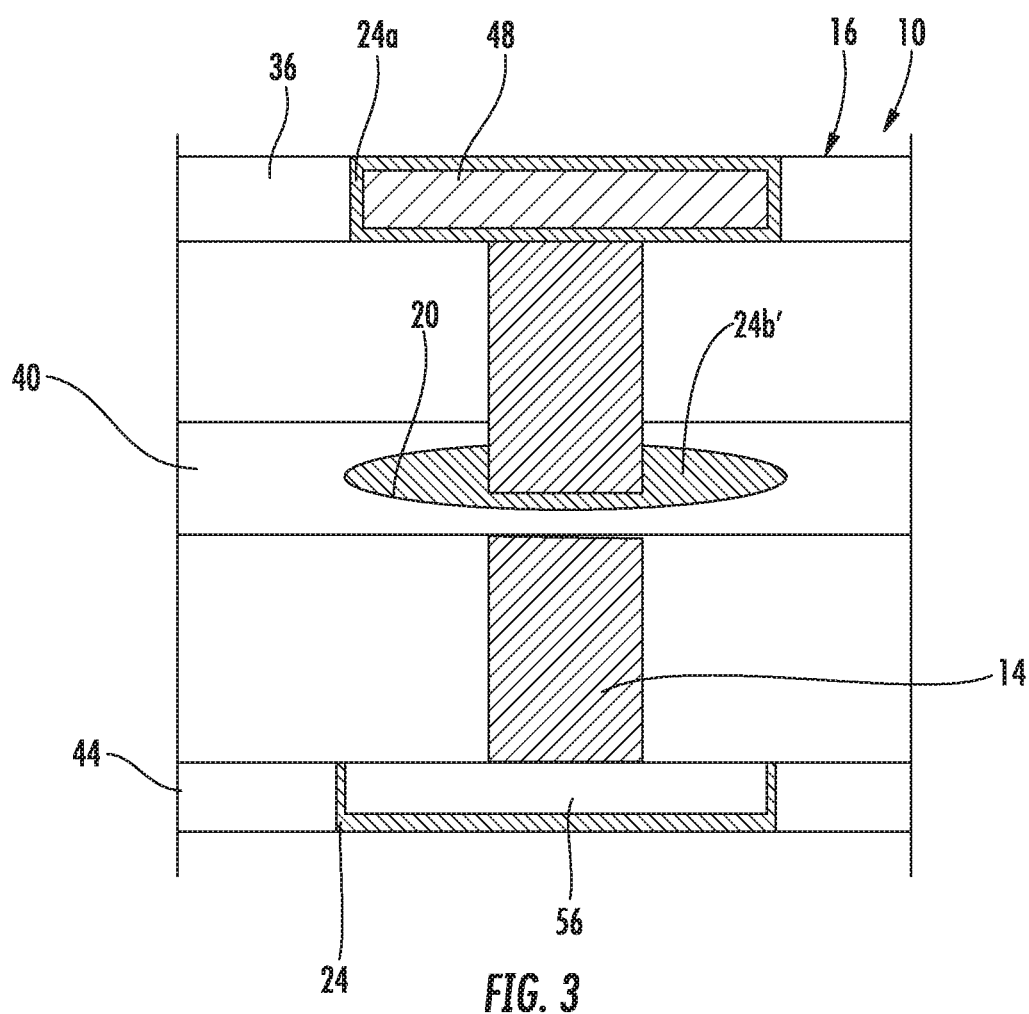
FIG. 3 illustrates another embodiment of a battery pack and a damping insert in direct contact with a battery cell.

In one embodiment shown in FIG. 3, the battery pack 10 lacks any guide sleeves 28, and instead includes damping inserts 24b' that are in direct contact with both the plurality of receptacles 20 of the first rack 40 and the plurality of battery cells 14. In this embodiment, the damping inserts 24b' are formed directly with the battery housing 16. The damping inserts 24b' are directly co-molded with the battery housing 16.

Figure 4:
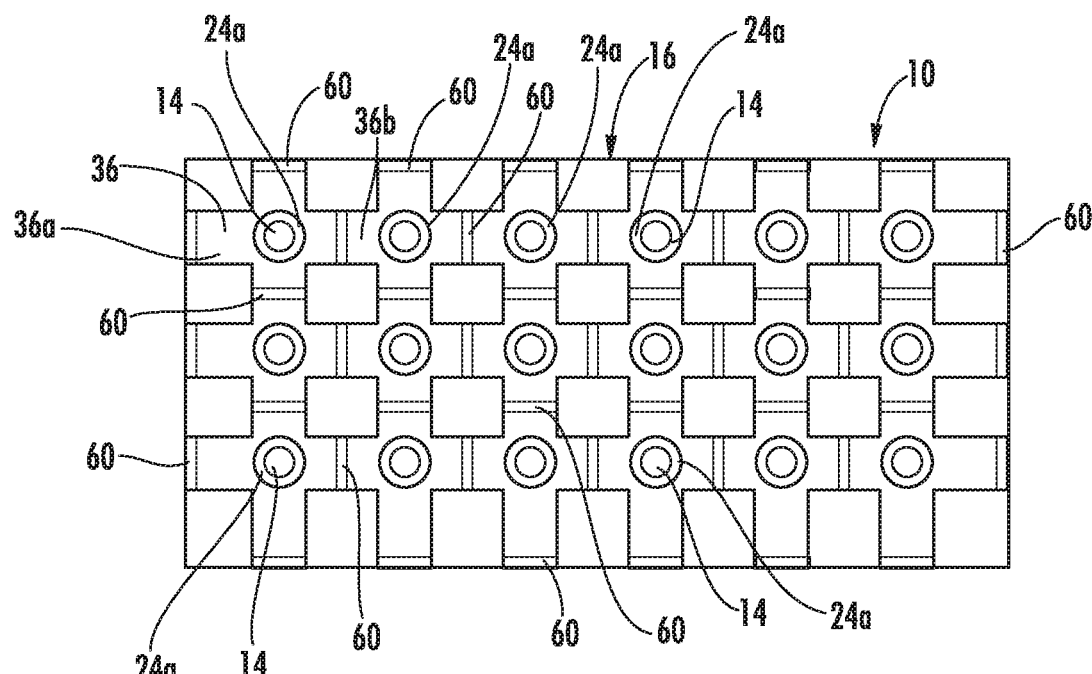
FIG. 4 is a schematic top view of a battery pack including a plurality of damping inserts arranged between battery cells.

As shown in FIG. 4, a plurality of joints 60 are arranged between portions of the first rack 36. This network of joints 60 provides improved damping ability for the battery housing 16 because the segments of the first rack 36a, 36b can move with respect to one another.

One of ordinary skill in the art recognizes that damping inserts could be provided in a variety of locations within the battery housing 16 based on the present disclosure.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A battery pack comprising:
   a plurality of battery cells;
   a battery housing comprising a plurality of receptacles that receive a respective one of the plurality of battery cells, wherein each receptacle of the plurality of receptacles is separated from one another by a flexible joint connection, wherein the flexible joint connection allows each receptacle of the plurality of receptacles to move independently of one another in the battery housing;
   a plurality of guide sleeves each having an inner periphery and an outer periphery, wherein each guide sleeve of the plurality of guide sleeves contacts the respective one of the plurality of battery cells at the inner periphery; and
   a plurality of damping inserts, each damping insert of the plurality of damping inserts positioned between the respective one of the plurality of battery cells and the battery housing, wherein each damping insert of the plurality of damping inserts contacts a respective one of the plurality of guide sleeves at the outer periphery and a portion of the battery housing surrounding the respective one of the plurality of battery cells, and wherein each damping insert of the plurality of damping inserts is separated and offset from the respective one of the plurality of battery cells by the respective one of the plurality of guide sleeves.

2. The battery pack of claim 1, wherein the plurality of damping inserts are formed from a material having greater flexibility than a material of the battery housing, and wherein each of the plurality of damping inserts are formed as a circular disc.

3. The battery pack of claim 1, wherein each damping insert of the plurality of damping inserts is formed as a circular disc in direct contact with a respective one of the plurality of receptacles surrounding each of the plurality of battery cells.

4. The battery pack of claim 1, wherein each of the plurality of battery cells are secured within the respective one of the plurality of guide sleeves via an interference fit.

5. The battery pack of claim 1, wherein the plurality of damping inserts are formed from a polymer or a metal alloy.

6. The battery pack of claim 5, wherein the plurality of damping inserts are formed from rubber.

7. The battery pack of claim 1, wherein each one of the plurality of damping inserts circumferentially surrounds the respective one of the plurality of battery cells.

8. The battery pack of claim 1, wherein the plurality of damping inserts are molded integrally with the battery housing.

9. The battery pack of claim 1, wherein each damping insert of the plurality of damping inserts is co-molded with the respective one of the plurality of guide sleeves.

10. The battery pack of claim 1, wherein the battery housing further comprises:
a first rack defining a first plurality of receptacles each configured to receive a top portion of a respective one of the plurality of battery cells;
a second rack defining the portion of the battery housing comprising a second plurality of receptacles, wherein the plurality of guide sleeves and the plurality of damping inserts are disposed in the second plurality of receptacles of the second rack, and wherein each of the plurality of battery cells is supported at a medial portion by the respective one of the plurality of guide sleeves; and
a third rack defining a third plurality of receptacles each configured to support a bottom portion of a respective one of the plurality of battery cells.

11. The battery pack of claim 10, wherein the first rack includes a busbar that is electrically connected to the plurality of battery cells, the second plurality of receptacles of the second rack are defined as through apertures, and the third rack includes a cooling plate that directly contacts the plurality of battery cells.

12. The battery pack of claim 11, further comprising a first plurality of damping inserts arranged between the first rack and the busbar, and a second plurality of damping inserts arranged between the third rack and the cooling plate.

13. The battery pack of claim 12, wherein the racks are segmented into a plurality of rigid rack portions, and a plurality of flexible joints disposed between each one of the plurality of rigid rack portions.

14. The battery pack of claim 13, wherein the plurality of flexible joints comprise a material having a higher flexibility than a material of the rigid rack portions.

15. The battery pack of claim 13, wherein the plurality of flexible joints are formed from a same material as the plurality of damping inserts.

16. A battery cell damping system, comprising:
a battery cell;
a battery housing comprising a plurality of receptacles configured to receive and surround a portion of the battery cell, wherein each receptacle of the plurality of receptacles is separated from one another by a flexible joint connection, wherein the flexible joint connection allows each receptacle of the plurality of receptacles to move independently of one another in the battery housing;
a guide sleeve in direct contact with a circumferential surface of the battery cell, wherein the guide sleeve is positioned at a medial portion of a length of the battery cell; and
a damping insert formed as a circular disc having an inner diameter and an outer diameter, wherein the inner diameter of the damping insert is disposed in direct contact with an outermost periphery of the guide sleeve and the outer diameter of the damping insert is disposed in direct contact with an inside surface of the receptacle, and wherein the damping insert provides a flexible connection between the battery cell and the battery housing.

17. The battery cell damping system of claim 16, wherein the damping insert is only in contact with the receptacle and the guide sleeve at the medial portion of the length of the battery cell.

18. The battery cell damping system of claim 16, wherein the damping insert is co-molded with the receptacle of the battery housing, and wherein a material of the damping insert has a higher flexibility than a material of the housing.

19. A battery housing, comprising:
an array of receptacles, wherein each receptacle in the array of receptacles comprises:
a rigid rack portion comprising a through aperture and a surface defining a periphery of the through aperture, wherein the rigid rack portions of each receptacle are separated from one another by a flexible joint connection, wherein the flexible joint connection allows each receptacle in the array of receptacles to move independently of one another in the battery housing;
a damping insert formed as a circular disc having an inner diameter and an outer diameter, wherein a portion of the outer diameter of the damping insert is arranged in direct contact with the surface of the through aperture;
a guide sleeve having an inner diameter and an outer diameter, wherein the outer diameter of the guide sleeve is arranged in direct contact with the inner diameter of the damping insert, wherein the inner diameter of the guide sleeve is configured to directly contact a circumferential surface of a battery cell disposed in each receptacle, wherein the damping inserts are formed from a material having greater flexibility than a material of the rigid rack portion, and wherein a flexibility of the damping insert relative to the rigid rack portion provides flexibility of the battery cell disposed in each receptacle relative to the battery housing.

20. The battery housing of claim 19, wherein the guide sleeve provides an interference fit with the circumferential surface of the battery cell disposed in each receptacle.

* * * * *